Figure 1:
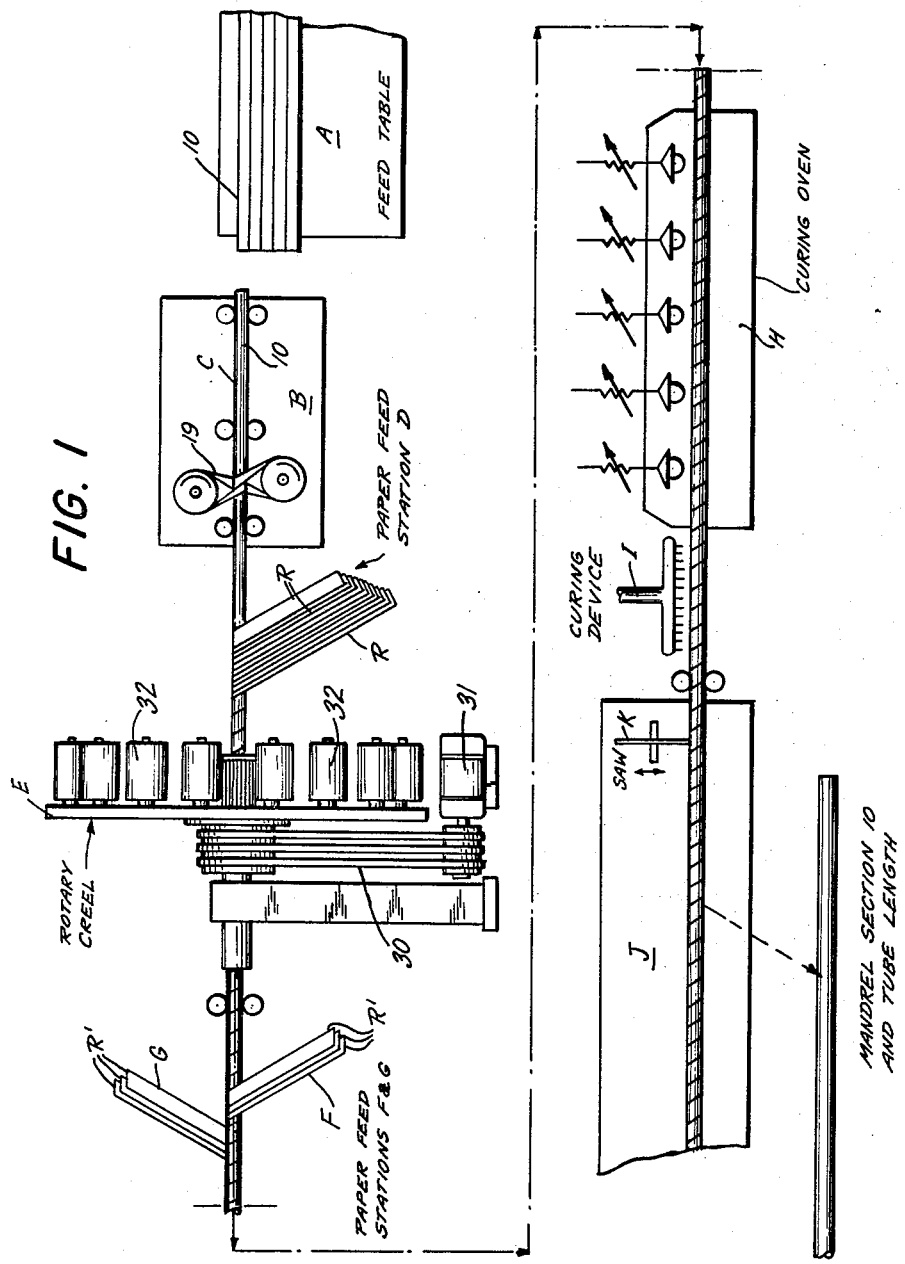

Aug. 4, 1964

P. R. WORN 3,143,148

PAPER TUBING

Filed June 18, 1962

3 Sheets-Sheet 1

INVENTOR.
PHILIP ROSS WORN

BY

*ATTORNEY*

Aug. 4, 1964   P. R. WORN   3,143,148
PAPER TUBING

Filed June 18, 1962   3 Sheets-Sheet 2

INVENTOR.
PHILIP ROSS WORN
BY
*James J. Kennedy*
ATTORNEY

Aug. 4, 1964
P. R. WORN
3,143,148
PAPER TUBING
Filed June 18, 1962
3 Sheets-Sheet 3
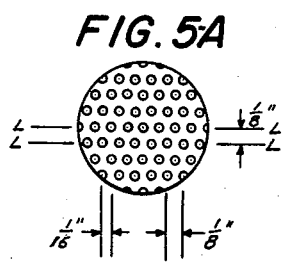
FIG. 5A
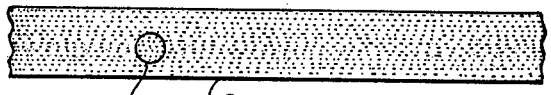
FIG. 5
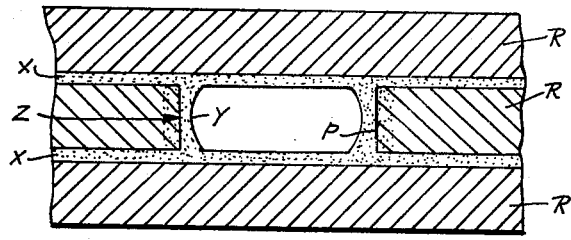
FIG. 6
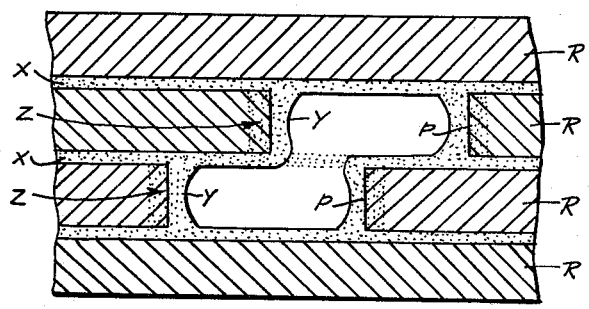
FIG. 7
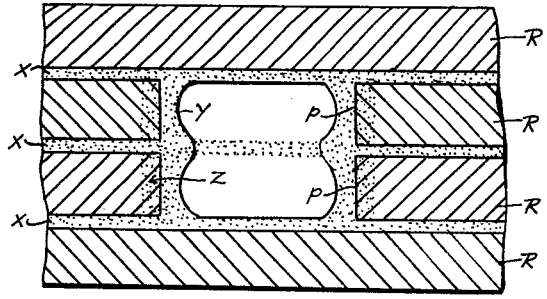
FIG. 8
INVENTOR.
PHILIP ROSS WORN
BY
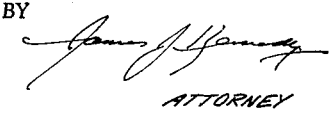
ATTORNEY ated Aug. 4, 1964

3,143,148
PAPER TUBING

Philip R. Worn, Princeton, N.J., assignor to Decorated Metal Manufacturing Company, Inc., Milltown, N.J., a corporation of New York
Filed June 18, 1962, Ser. No. 203,658
4 Claims. (Cl. 138—144)

This invention relates to paper tubing and the manufacture thereof.

Paper tubing as heretofore manufactured consists essentially of a number of plies or layers of paper bonded together by adhesive, which generally does not impregnate the paper layers themselves to any appreciable depth. Economically practical methods of continuous manufacture have been such that the quantity and fluidity of the adhesive used and also the tension with which the paper is wound are both confined to ranges which are by no means ideal from the standpoint of producing a tube of maximum strength. For example, in the ordinary spiral wound paper tube produced by advancing the tube as formed over a stationary mandrel, the tension on the paper as well as the quantity of fluid adhesive are limited by the need for transmitting driving force from layer to layer through the paper tube as it is formed while overcoming any frictional forces between the innermost layer and the mandrel. Paper tubing as thus produced, while cheap and having very desirable properties for many purposes has been limited in strength so as to restrict its use for applications such as textile tubes, where the stresses involved both radially and axially may be quite heavy.

In prior Worn and L'Allemand applications Serial No. 29,738, filed May 17, 1960, for Textile Bobbin and Serial No. 177,927, filed March 6, 1962, for Method and Apparatus for Manufacturing Tubing, there are disclosed methods and apparatus for forming laminated tubing under controllable tension conditions and while permitting the use of adhesive or resin under conditions as to quantity and fluidity such that tubing is produced on a practical mass production basis with characteristics as to mechanical strength and otherwise which are markedly superior to those obtainable by previously known methods and apparatus. In one aspect, the present application discloses an improvement on the methods and apparatus of the said applications.

It is an object of the invention to provide a method for manufacturing paper tubing which permits optimum tension conditions during the winding and also the use of adhesive or resin bonding agent in optimum quantities and in excess of those practical with prior mass production methods.

A further object is to provide a method which provides for support of the tubing during drying or resin setting operations requiring a considerable length of time.

The paper used in making the tube of the invention may be of any type conveniently available for paper tube manufacture and differs (as to the inner plies) from that heretofore used in being perforated. The perforations permit the formation of an adhesive bond between the underlying and overlying layers and also the impregnation of the paper surrounding the perforation, thereby providing the tubing with markedly increased strength. The perforations also increase the capacity of the paper to carry adhesive or other bonding agent. The paper is wound on an independently driven mandrel, permitting very large increase in quantity of adhesive and in fluidity of adhesive at time of winding.

Tubing embodying the invention in a preferred form and an apparatus and method for making the same will now be described with reference to the accompanying drawing, and the features forming the invention will then be pointed out in the appended claims.

Figure 2:
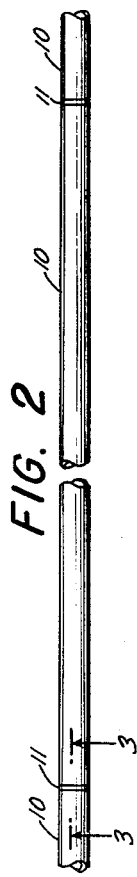
Figure 3:
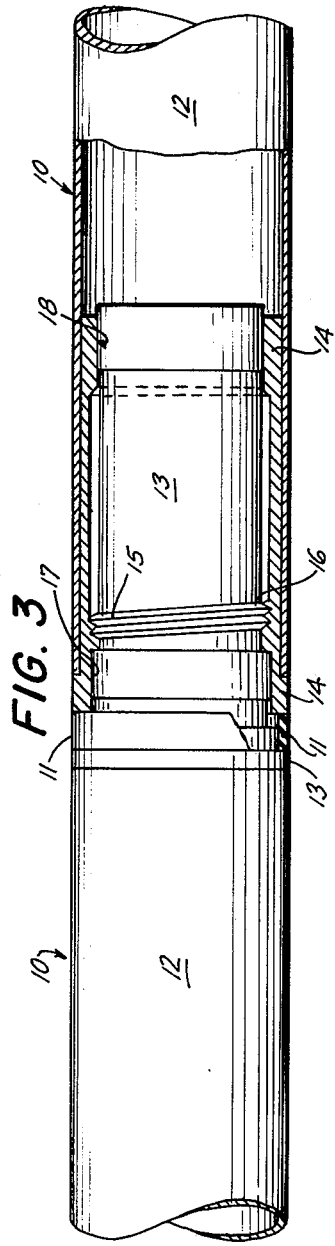
Figure 4:
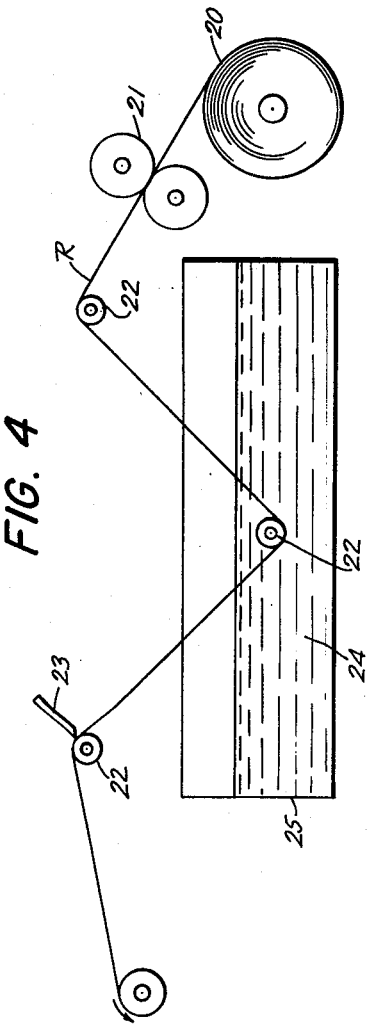

In the drawing:
FIG. 1 is a schematic showing apparatus for manufacturing the tubing of the invention;
FIG. 2 is an elevation view of a mandrel element of FIG. 1;
FIG. 3 is an enlarged view partly in section and partly in elevation taken on the line 3—3 of FIG. 2;
FIG. 4 is a schematic showing a paper ribbon supply element;
FIG. 5 is a flat view of one of the paper ribbons used in forming the tubing, with a circle placed thereon to indicate the area shown in an enlarged form in FIG. 5–A;
FIG. 5–A is an enlarged view of the portion of the ribbon of FIG. 5 enclosed within the circle thereon, which is marked "5–A"; and
FIGS. 6, 7 and 8 are schematic views showing the bond between layers of paper, which are formed in and around the perforations.

Apparatus essentially like that disclosed in the above mentioned application Serial No. 177,927 may be used in making the tubing of the present invention. A sectional mandrel as there disclosed is utilized, mandrel sections being added successively as needed at the mandrel feed station A. The mandrel C is advanced and rotated by the mandrel drive mechanism B, has paper wound on it to form the tube at paper feed station D and continues through one or more rotary creels E where glass or other fibers are incorporated, if desired. Further paper feed stations F, G may follow the creel E, and the paper tube formed on the mandrel may proceed through a curing oven H and cooling device I to delivery station J where it is severed, as by a saw K and is delivered at L. Reference may be made to the said application for such details of these structures as, in themselves, form no part of the present invention and are not described herein.

The mandrel C comprises a number of sections 10 removably secured together by interfitting plug and socket elements as described in detail in the just mentioned application. As indicated in FIG. 2, the joints between adjacent sections have grooves containing disposable rings 11, typically of plastic or paper, and the saw K cuts through the tubing over these rings and through the rings. FIG. 3 shows a typical joint between adjacent mandrel elements 10, these elements comprising tubular sections 12 with plug and socket members 13 and 14 force fitted or otherwise secured into them. As will be understood, each section 10 has a plug element 13 at one end and a socket element 14 at the other, thus providing for coupling together any desired number so as to form the mandrel C. The plug and socket elements have cooperating threads 15, 16 and cooperating bearing surfaces as indicated at 17 and 18, and the element 13 is formed with a groove receiving the ring 11 which fits between the coupled elements and is preferably somewhat compressed in screwing the same together. By reason of this compression, tendency of the sections to come apart is eliminated due to the tension in the screw threading. However, when the saw K cuts through the ring 11, sufficient of the material is removed so as to eliminate the compression of the ring and thus free the coupling thread for easy turning. The mandrel section 10 is delivered along with the tubing on it and may serve to support the tubing during drying, heating to evaporate adhesive solvent or for setting a thermosetting bonding agent. The tubing is thereafter removed by axially directed force, stripping it from the mandrel, as described in the said application. The mandrel sections 10 may be of various lengths, to suit particular applications, but for present purposes a length of about twenty feet per section is found convenient. As the mandrel C feeds through the apparatus, sections thereof being removed successively at the delivery station J, sections are also added at the mandrel feed table A, maintaining a continuous length of mandrel C between feed station A and delivery station J.

The mandrel drive mechanism B comprises guide rollers for maintaining the mandrel C in laterally fixed position and a crossed belt drive 19 for advancing the mandrel and rotating it about its axis at predetermined rates.

Paper ribbons R are wound on the mandrel C at the paper feed station D to a helix angle corresponding to the rate of advance as compared to the rate of rotation of the mandrel. Each ribbon R may be supplied from a roll 20, as shown in FIG. 4, passed through a perforating device 21 over and under rollers 22 and into and out of a bath of liquid adhesive or resin 24 contained in a pot 25 and thence to the mandrel C. A doctor blade 23 may be used to regulate the quantity of liquid carried by the ribbon. Alternatively, the ribbon on the roll 20 may be pre-perforated, in which case, the perforating mechanism 21 may be dispensed with. The ribbons R are wound onto the mandrel C and any subjacent ribbons thereon in overlapped relation so that the edges of the ribbon in one layer are spaced axially of the tubing from the edges of underlying and overlying layers, as is usual.

The mandrel, having any desired number of paper plies wound on it, may now pass through the rotary creel E, which is driven by belts 30 by motor and gear reduction unit 31 and carries a number of spools 32 of glass or other filaments. If desired, such filaments may be superposed on the plies of paper previously wound on the mandrel at any desired helical angle or direction of helix and in particular the filaments may be applied in parallelism to the axis of the tube. Following the rotary creel E, further ribbons R' may be applied at stations F and G, these ribbons being supplied by arrangements similar to those described in connection with the station D.

The mandrel and tube thereon continue to the cut off and delivery station, where the tube lengths are severed by the saw K operating over the joint ring 11, previously mentioned and also cutting through this ring. The saw cut, releasing any compression on the ring, as previously mentioned, enables the cut off section of mandrel and the formed tubing length thereon to be turned so as to unscrew it, thus separating it from the mandrel. The tubing section on the thus removed mandrel section may now be subjected to any desired drying or resin setting operations, following which the completed tubing is removed by forcing it axially off the mandrel, as described in the above mentioned application.

Where adhesive (such as sodium silicate) dissolved in a volatile vehicle (such as water) is used, the curing oven H and cooling device I may be omitted, and the water or other solvent removed after delivery of the cut off length by passing the length, still supported by its mandrel section 10, through suitable ovens or other drying devices. Where, however, synthetic resin, such, for example, as the epoxy resin referred to in the above mentioned applications is used, the curing devices will ordinarily be employed.

The innermost and outermost layer of paper (ordinarily one or two ribbons R, depending on ribbon width) are preferably unperforated and may have adhesive applied to only one surface, for bonding to adjacent layers of paper. The intermediate layers are perforated as indicated in FIG. 5-A. The perforations may be arranged on lines L parallel to the edges of the ribbon and spaced apart by about one-eighth inch, the perforations along each line being similarly spaced, but the arrangement being staggered as shown in FIG. 5-A so that the perforations of each line L are spaced apart longitudinally of the ribbons by half the pitch distance or, in this case, by one-sixteenth inch. The transverse spacing of perforations accordingly is one-quarter inch, improving the strength of the ribbon by comparison with unstaggered perforations of similar number and size. The quantity of paper removed in perforating is approximately 25% (actually in the illustrative case just discussed, 23%).

The specific type of perforation just described involves the use of about seventy-five holes per square inch, the perforations being substantially circular and arranged in a geometric pattern as just described. Where winding strength is adequate without the staggering of adjacent lines of perforations as mentioned above, the staggering may be omitted so that the transverse and longitudinal pitches of the perforations are the same, and the perforations may also be made in an irregular fashion and may themselves have irregular outlines, the shape and distribution of the perforations depending primarily upon the perforating mechanism used, so that comparable results may be obtained with perforations of comparable number per square inch with comparable removal of paper even though the shape of the individual perforations and their distribution may be quite different. The number of perforations per unit area as well as the percentage of paper removed are also subject to considerable variation depending upon the specific tubing and class of service which may be involved, as well as the viscosity and surface tension of the adhesive in its liquid state.

By reason of the thickness of the paper (which may be about .020 inch), the angular spacing between perforations in any layer as compared to an underlying or overlying layer will differ slightly and the helical winding will introduce a further shift in the axial direction of the perforations of one layer as compared to adjoining layers. It is found that in any section of a completed tube, the superposition of perforations with relation to the perforations of adjoining layers or with reference to the unperforated material between such perforations will vary in a random manner producing over any area of considerable size sufficient uniformity so that any special arrangements for registering the layers of paper with each other either circumferentially or axially have been found unnecessary.

The quantity of adhesive which can be utilized in conventional paper tubing is limited to about five percent by weight of wet adhesive as compared to the paper, for sodium silicate, and the adhesive must be dried sufficiently as wrapped so as to have substantial tack for transmitting torque between successive plies or layers. Utilizing the method of the invention, it is found practical to use about fifty-five percent by weight of sodium silicate adhesive and to wind the tube while the adhesive is in a thoroughly wet and fluid condition. The perforations assist in increasing the adhesive carrying capacity of the paper.

An important advantage of the tubing construction of the invention is that the perforations permit absorption of adhesive around each perforation into the paper in a direction parallel to the plane thereof and in alignment with the lay of the fibers, so that surrounding each perforation there is an annular area of paper impregnated with adhesive throughout its thickness and the depth of penetration of this layer in the plane of the paper (radially of the perforation) appears to be very considerable and of the order of hundredths of an inch rather than thousandths of an inch as is the case with any penetration of adhesive into the sheet through its surface. This provides a novel structure in which the tendency of the paper layers to separate between the adhesive bonds joining layers together no longer limits the strength of tube available, as heretofore. For purposes of clarifying the nature of the structure of the tubing of the present invention, which may be made in practically any desired wall thickness and diameter, a tube having about one and three-quarter inches diameter and made up of ten layers of paper will be taken as illustrative, by way of example, of certain characteristics of the invention. In such a structure, with seventy-five perforations per square inch, it will be apparent that each layer will contain about four hundred perforations per inch of length of tubing (the circumference being about five and one-half inches) and that eight perforated layers of paper will have a total of three thousand or more such perforations per axial inch of tubing. The number and fineness of the structural elements thus provided as also the thinness of the adhesive film between layers is not readily illustratable to scale but the essential characteristics of the structure will be readily understood from the schematic views of FIGS. 6, 7 and 8, which are on a very much enlarged scale and also exaggerate the thickness of adhesive film between paper surfaces for clarity of showing. Each of these figures indicates a section through the center of one of the perforations and illustrates various possible conditions which may exist with respect to adjacent layers of paper. In FIG. 6, the perforation $p$ in the central layer is in registry with unperforated areas of the overlying and underlying layers. The surfaces of these layers which overlie each other are joined together by the adhesive (indicated by stippling) as at X. The adhesive also lines the wall of the perforation $p$ to a substantial thickness as indicated at Y and impregnates the paper surrounding the perforation to a substantial depth as indicated at Z. For purposes of illustration, the thickness of the adhesive layer X between successive layers of paper has been exaggerated, while the thickness of the layers Y and Z may be taken as somewhat in proportion of the actual thicknesses in relation to the thickness of paper and size of the perforation. The comparatively small penetration from the layer X into the paper layers through their surfaces, and which will ordinarily be of the order of a few thousandths of an inch, has not been indicated. It will be apparent that the adhesive within and around the perforation $p$ forms a structure similar to the ordinary eyelet-rivet, extending continuously both within the perforation wall and in an annular space within the paper surrounding it, from the overlying layer R to the underlying layer R, thus bonding these layers together without relying upon the strength of unimpregnated paper for this purpose. As shown in FIG. 7, the perforation $p$ may register partly with another perforation and partly with unperforated paper. The situation here is essentially the same as in FIG. 6, with the exception that in this case in addition to the middle two layers of paper R being joined together by an eyelet-rivet structure as in the case of FIG. 6, this structure continues in an irregular way and also joins in the top and bottom layers indicated even though these layers are spaced apart by two intervening layers of paper. A third condition in which perforations of adjacent layers register exactly is illustrated in FIG. 8, showing in this case the formation of an eyelet-rivet of the character indicated in FIG. 6 but extending through two layers of paper so as to join four layers together. As indicated above, rivet structures of these three general forms tend to be distributed in a random fashion both circumferentially and radially of the tube wall, thus providing a wall structure in which the adhesive and paper are combined together in an entirely different way from prior tubing.

Tubing of this structure, utilizing the same type of adhesive but in the greater quantities and with the entirely different distribution throughout the tube wall which the present invention provides for has been found to possess more than double the strength of conventional tubing. For example, high quality paper tubing, such as previously manufactured for carrying textile fibers, was found to fail at about 130 p.s.i. on a flat plate test, the tubing having a quarter inch wall and $3^{11}\!/\!_{16}$ I.D. Conventional tubing of these particular dimensions was selected for purpose of comparison, since it is a commercially used size and type of tubing, and the strength comparisons made with respect to it appear fairly representative with respect to tubing of other diameters and wall thickness within commercially practical limits. A ten ply tube of the specified I.D. and manufactured according to the present invention (using sodium silicate adhesive, as in the comparison sample) and having a .210 wall thickness was found to have a strength under the same flat plate test conditions of 200 p.s.i., an advantage of over 50% by comparison with the conventional tubing. A tube constructed according to the invention but with further plies to produce a wall thickness of .245 inch was found to fail at 280 p.s.i., thus showing over twice the strength of conventional tubing of comparable or slightly greater wall thickness.

The tubing of the invention fails in an entirely different manner from conventional tubing. With the latter as the tube is compressed into ovality, failure typically occurs by wrinkling of the tube wall along the long axis of the oval (at right angles to line of application of pressure), and takes the form of a progressive wrinkling and separation of the paper layers between the adhesive bonds joining the same. The tubing of the present invention, however, fails (under a much greater stress, as indicated above) by a clean axial fracture (at right angles to the paper layers) and along the lines of application of pressure, these being located on the short diameter of the oval.

The tubing of the invention perforated as in the case discussed above by way of example, contains about thirty-five hundred eyelet-rivet elements per cubic inch of tube wall joined to the bonding film between layers and to each other in various manners and providing a fine structure of a cellular character in which strain within any layer of paper cannot proceed for any substantial distance in any direction without being interrupted by one of the eyelet-rivet elements. Failure through separation of the paper layers internally is thus prevented. With thicker paper or smaller numbers of perforations per square inch of paper, this figure is somewhat reduced, but in any event, several thousand eyelet-rivet elements per cubic inch are present.

The ratio of bonding agent to paper in a finished tube or portion thereof formed of perforated paper as described above may be fifty percent or more by weight of bonding agent in its fluid condition, or an amount sufficient to form the films between layers of paper and also to fill the perforations prior to penetration through their walls into the paper. With adhesives carried by solvents, such as sodium silicate above mentioned, the weight of dried adhesive in the finished tubing may be as much as twenty-five percent or more by comparison with the paper wall with resins which set without substantial evaporation, the amount of such resins may be anywhere up to fifty percent or more of the paper by weight, as desired. With paper tubing of previous construction, since the failure occurs in the paper itself between the adhesive or bonding agent layers, it is apparent that no substantial improvements in such constructions can be obtained by improvements of the bonding agents, while the present invention permits realizing to the fullest extent the inherent strength characteristics of whatever bonding agents may be employed.

The action of the eyelet construction of the invention involves the strengthening of each layer of paper as well as the bonding of separated layers together. It is an easy matter to separate the top and bottom layers of a sheet of ordinary paper by peeling the same apart and very little force is required to do this. Failure in previous paper tubing takes place in essentially this manner. Once, however, the paper has been riveted together over its area, any such separation is prevented as soon as one of the rivet structures is encountered and the separation may continue only by breaking the rivet structure or breaking the paper loose around it, both of which actions require considerable force. Accordingly, failure occurs as a sharp breaking action rather than the layer separation characteristic of previously known constructions, as pointed out above. Where the eyelet-rivet structures of the present construction are in alignment, they form bonds extending through more than one layer of paper. Where they are not, the eyelets of adjacent layers are still close enough together so that there is no substantial length of paper between the same and, hence, no substantial separation of paper fibers even between eyelets occurs.

The method of construction of the tubing of the present invention permits winding under greater tension than in prior methods of constructing paper tubing, permits use of adhesive or other bonding agent in a more fluid condition and in quantities over fifty percent by weight of paper. Where adhesives or other bonding agents such as thermosetting resins are employed, instead of sodium silicate, and have superior mechanical properties, the strength of the tubing overall is correspondingly improved. Filaments of glass or other fiber running in a generally axial direction and supplied by one or more rotary creels E may be incorporated between one or more of the layers of the tube, so as to increase the strength of the tubing in the axial direction where necessary.

What is claimed is:

1. A tubular member comprising a series of layers of paper, each layer being provided with perforations throughout their entire areas, the layers being so wound that the perforations in the layers only partially overlap, and sufficient bonding means disposed between the layers and into the openings between the layers as to adhere the surfaces of the layers and to extend into the perforations as to form a rivet like connection therebetween.

2. Tubing comprising a plurality of wound layers of paper having perforations covering substantially their entire areas, the layers being so wound that the perforations in the layers only partially overlap, and sufficient bonding means disposed between the layers and into the openings between the layers as to adhere, joining the surfaces of adjacent layers together, and also cover the walls of the perforations and penetrate substantially into the paper surrounding the said perforations of each layer throughout the thickness of said layer, the bonding means within perforations and annular regions penetrated by it around the perforations forming structures of eyelet-rivet configuration joining spaced layers together.

3. Tubing according to claim 2, in which the perforations in each said layer comprise perforations registering with unperforated areas of adjacent layers, perforations registering partly with perforations of adjacent layers and perforations registering substantially with perforations of adjacent layers, whereby the said eyelet-rivet configurations extend through one layer and more than one layer of the tubing, thus joining together layers separated by a single layer and also layers separated by more than one layer.

4. Tubing according to claim 2, in which there are at least a thousand such eyelet-rivet configurations per cubic inch of tubing wall.

References Cited in the file of this patent

UNITED STATES PATENTS

| 893,857 | Lutz et al. | July 21, 1909 |
| 1,862,259 | Dunlap | June 7, 1932 |
| 2,815,043 | Kleiner et al. | Dec. 3, 1957 |

FOREIGN PATENTS

| 9,240 | Great Britain | Apr. 19, 1909 |
| 9,498 | Great Britain | Sept. 1, 1910 |
| 462,849 | Great Britain | Mar. 17, 1937 |
| 564,929 | France | Jan. 15, 1934 |